Feb. 17, 1970 B. L. THORMAN ETAL 3,496,373
APPARATUS FOR DETERMINING WALL THICKNESS OF ARTICLES
Filed Oct. 23, 1967
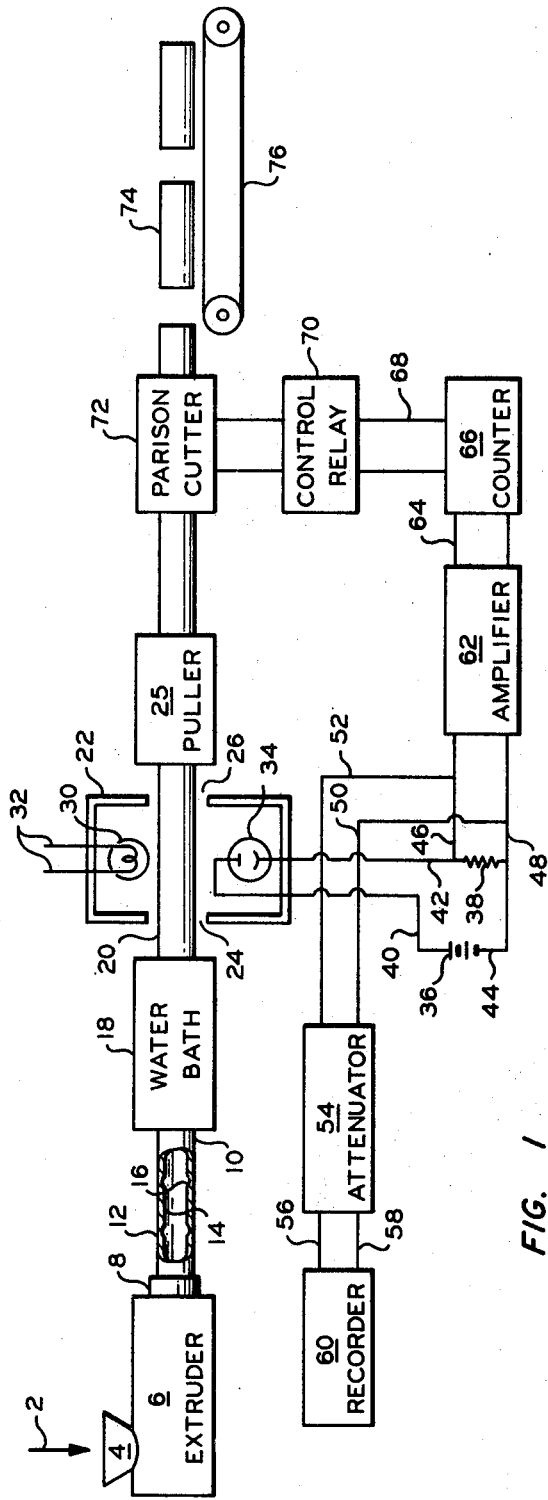
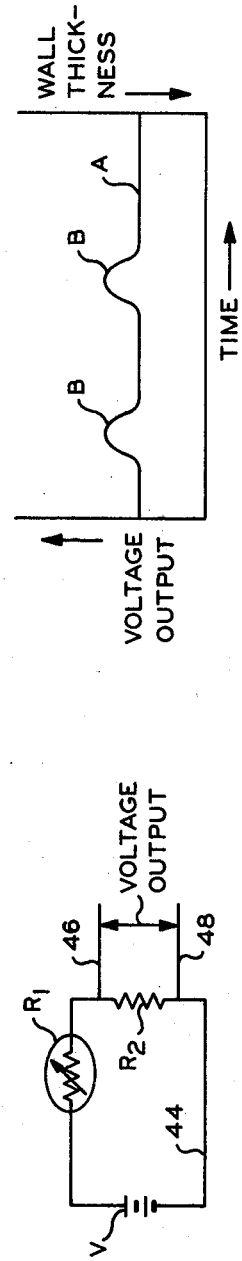
INVENTORS
B. L. THORMAN
G. E. MADER, JR
BY
*Young & Quigg*
ATTORNEYS United States Patent Office 3,496,373
Patented Feb. 17, 1970

3,496,373
APPARATUS FOR DETERMINING WALL
THICKNESS OF ARTICLES
Baxter L. Thorman and George E. Mader, Jr., Bartlesville, Okla., assignors to Phillips Petroleum Company, a corporation of Delaware
Filed Oct. 23, 1967, Ser. No. 677,250
Int. Cl. H01j 39/12; G01n 21/30
U.S. Cl. 250—222  7 Claims

ABSTRACT OF THE DISCLOSURE

An apparatus for determining the wall thickness of articles having a light source which directs light onto the outer surface of the article and a detector means, which responds to changes in intensity of light transmitted through the article, arranged in an electrical circuit so that a variable electrical output representative of the article wall thickness is produced as the detector means responds to the changes in intensity of light.

---

This invention relates to apparatus for determining the wall thickness of articles. In another aspect, this invention relates to apparatus for sensing the wall thickness of a tubular extrudate and controlling the cutting of the extrudate into parison lengths responsive thereto.

Quite frequently during the manufacture of articles it is desirable to determine the wall thickness thereof. Many of these articles, such as tubular articles, are inaccessible for taking physical measurements without first dissecting them. A determination of the internal profile of some tubular articles is also sometimes desired. Some materials are either opaque or only semi-translucent so a visual inspection of the internal profile is precluded. The manufacture of extruded plastic parisons which are blow-molded into articles, such as bottles, is one particular area where these determinations are desired.

When blow-molding an irregular shaped article from uniform wall thickness tubular parisons, certain portions of the article can have unnecessarily thick walls. Some portions of the parison are not stretched as much as other portions during the blow-molding operation. In order to conserve material, it has been proposed to extrude the parison with an internal wall profile so that it has thinner walls as neck-down sections at those points where thicker wall would otherwise occur. This internal wall profile is usually produced by a movable mechanism in the extruder which is operated to vary the annular opening through which the plastic material is being extruded so that the outside diameter of the tubular extrudate remains constant and the inside diameter varies.

Extrudates produced in this manner by a continuous extrusion operation present two areas of particular difficulty. First, it is desirable to be able to determine the precise configuration of the internal profile of the extrudate as it is being extruded on a continuous basis so that necessary adjustments can be made to the extruder to obtain the desired profile. Drawbacks associated with an inspection technique where samples of the parison are dissected to take physical measurements are readily apparent. The time and expense of such a destructive inspection technique as well as the possible production of many parisons which fail to meet specification requirements are the major disadvantages. Second, it may be desirable to cut the extrudate into single or multiple parison lengths. In either case the extrudate must be cut at an exact location relative to the neck-down sections so that the article blow-molded therefrom will have the desired wall thickness. This cutting operation could be controlled by a timing mechanism or by a mechanism controlled by the extruding machine cycle, such as by a predetermined number of revolutions of the extrusion screw; however, variations in the extrusion rate, which can be created by such things as a slight change in the plasticity of the material being extruded, result in variations in the length of extrudate extruded for any pre-set time or machine cycle. Any error in the position of the cut relative to the neck-down section created by this change in extrusion rate can be compounded during a continuous operation. Consequently, for accurate cutting of profile parisons, the cutting operation should be controlled so that any variations in extrusion rate have a minimal effect.

Accordingly, an object of this invention is to provide apparatus capable of continuously determining the wall thickness of articles.

Another object of this invention is to provide apparatus capable of determining the wall thickness of tubular articles without dissecting same.

Another object of this invention is to provide apparatus capable of determining the internal profile of a tubular extrudate.

A further object of this invention is to provide apparatus capable of continuously determining the internal profile of a tubular extrudate having neck-down sections and controlling the cutting of the extrudate into parison lengths relative to the position of these neck-down sections.

Other objects, aspects and advantages of this invention will become readily apparent to those skilled in the art from the following detailed description, drawings and appended claims.

According to this invention there is provided apparatus comprising a light source means which directs a light beam through the walls of the tubular article; a detector means, positioned opposite to the light source means and spaced therefrom so the article can be passed between them, which is responsive to the change in the intensity of light transmitted through the walls of the article; an electrical circuit interconnected with the detector means so that, as said detector responds to the change and intensity of light sensed thereby, a variable electrical output representative of the wall thickness of the article is produced; and a means for indicating this variable electrical output.

Also according to this invention means are provided for using the electrical output produced as described above as a control signal for initiating the parison-cutting operation when an electrical output corresponding to the desired portion of a neck-down section is sensed.

Also according to this invention means are provided for delaying the initiation of the control signal to the parison-cutting operation until a predetermined number of neck-down sections have been sensed.

FIGURE 1 is a schematic representation of a system embodying this invention where the internal profile of a tubular extrudate is determined and the parison-cutting operation is controlled in response to this determination.

FIGURE 2 is a simplified electrical diagram showing an exemplary circuit associated with a photoconductive cell to produce the desired electrical ouptut.

FIGURE 3 is a graphic representation of the voltage output provided by a photoconductive cell used as the detector means for the internal profile of an extrudate containing neck-down sections.

Reference is made to the drawings for a detailed description of the apparatus embodied by this invention. FIGURE 1 shows a system embodying this invention. It must be understood that the invention is shown in conjunction with an overall system for the purposes of illustration and is not to be construed as limited thereto. Plastic material 2 in pellet-form is fed into hopper 4 of extruder 6 wherein it is heated to its molten state and extruded through die head 8. Die head 8 includes a movable mandrel (not shown) which is operated to change the annular opening through which the molten material is extruded in tubular form. This variation in the tubular opening in die head 8 produces an extrudate 10 having a smooth outer surface 12 and an inner surface 14 having neck-down sections 16. Molten extrudate 10 is passed from die head 8 to water bath 18 wherein it is cooled while the outside surface is subjected to a subatmospheric pressure to prevent collapse of the molten tube.

The cooled extrudate 20 passes from water bath 18 into chamber 22 through opening 24 and exits therefrom through opening 26. The extrudate is pulled along its path of movement by a conventional pulling mechanism 25. Chamber 22 includes a conventional light source 30, such as an incandescent light bulb, connected to a suitable power source (not shown) through electrical leads 32 and a conventional photosensitive device 34, such as a photoconductive cell, which exhibits varying electrical characteristics under the influence of light. Light source 30 and photosensitive device 34 are spaced apart and arranged so that they are diametrically opposed to each other relative to extrudate 20 which passes therebetween.

Photosensitive device 34 is connected to a suitable DC voltage source 36 and a fixed resistor 38 by electrical leads shown schematically as 40, 42 and 44. Light transmitted by light source 30 through the walls of extrudate 20 is sensed by photosensitive device 34 and a millivolt output representative of the wall thickness and internal profile thereof, produced as described hereinafter, is transmitted through electrical leads 46 and 48.

Chamber 22 is constructed so that a minimum of light can enter from the external surroundings. It is either constructed from a light-absorbing material or the internal surfaces are coated with a light-absorbing material in order to minimize light reflection. Light source 30 is preferably located in close proximity to the extrudate 20; however, if desired it can be located a reasonable distance from extrudate 20 in which case a focusing lens is used to insure that the light is directed through the walls of the extrudate. Photosensitive device 34 preferably has a light shield to prevent light other than that being transmitted through the extrudate walls from being sensed thereby; however, if it is positioned in close proximity to extrudate 20 the light shield is not required.

The electrical output from the electrical circuit associated with photosensitive device 34 is transmitted to attenuator 54 through electrical leads 50 and 52 and from attenuator 54 to a conventional recorder 60, a conventional direct read-out type recorder, through electrical leads 56 and 58. Attenuator 54 is a conventional electrical device, such as a potentiometer, for adjusting the electrical output so that it is compatible with the operating range of recorder 60. This attenuator is not required if the electrical output is within the operating range of the recorder.

FIGURE 2 is a simplified electrical diagram showing the electrical circuitry associated with the photosensitive device 34. As shown in this diagram the photosensitive device is a conventional photoconductive cell, the resistance of which decreases as the intensity of light sensed thereby increases; therefore, it is shown as a variable resistor $R_1$ in the diagram. $R_2$ is a fixed resistor corresponding to 38 of FIGURE 1 and V is a DC voltage supply corresponding to 36 of FIGURE 1. The other reference numerals of FIGURE 2 represent corresponding portions of the electrical circuit of FIGURE 1. The amount of light transmitted through the extrudate walls and sensed by the photoconductive cell is a function of wall thickness, i.e., as the wall thickness decreases the amount of illumination passing therethrough increases; hence, resistance $R_1$, which varies with the intensity of light, is also a function of the extrudate wall thickness. From the relationship $$E = \left(\frac{V}{R_1 + R_2}\right) R_2$$

it can be seen that as $R_1$ decreases with a decrease in extrudate wall thickness, the output voltage of the electrical circuit shown in FIGURE 2 increases. As a neck-down section of the extrudate passes beneath the light source, the voltage output will vary correspondingly and a voltage profile representative of the internal wall profile is produced. FIGURE 3 depicts a voltage output profile representative of the internal wall profile of an extrudate having neck-down sections passing through the apparatus of this invention when a photoconductive cell is used as the detector means.

Recorder 60 produces a direct read-out of this voltage output. The recorder can be calibrated so that the reading is in dimensional units rather than voltage so that the wall thickness and the dimensions of the neck-down section can be read directly from the recording. In FIGURE 3, the straight-line portions of the graph A represent the continuous wall thickness of the extrudate while the curved portions B represent the dimensions and profile of the neck-down portions. This provides the capability of observing and permanently recording the internal profile of an extrudate on a continuous basis. Any undesired changes in the extrudate wall thickness or neck-down sections can be readily identified and the necessary changes made to the extrusion equipment. Any other conventional indicating means, such as a voltmeter, can be used in place of recorder 60 if a permanent recording is not desired.

Referring again to FIGURE 1, in accordance with another embodiment of this invention, electrical leads 46 and 48 are connected to a conventional amplifier 62 which amplifies the voltage to a level usable for control purposes. The output from amplifier 62 is transmitted via electrical leads 64 to a counting device 66. Counting device 66 is a conventional electrical device which receives an electrical signal and transmits an output when an input signal at a predetermined voltage level has been sensed a pre-set number of times, such as a Rotomite Stepper Relay made by Guardian Electric Manufacturing Company, Chicago, Ill. The output from counting device 66 is transmitted to a control relay 70 via electrical leads 68. Control relay 70 is electrically connected to parison cutter 72 so that when it is energized by the output from counting device 66 the cutting operation is initiated and extrudate 20 is cut into the desired parison lengths. Parisons 74 are transferred by conveying means 76 from parison cutter 72 for packaging, storage, or blow-molding operations.

Counting device 66 provides the capability for varying the parison lengths into which the extrudate is cut. It can be adjusted so that as each time the voltage has increased to a prescribed level indicating the desired position for cutting, a signal is sent to control relay 70 via electrical leads 68 and parison cutter 72 is operated or it can be adjusted so that a number of neck-down portions are indicated before a signal is sent to operate the parison cutter. Of course, if the parisons are being cut into single lengths, control relay 70 can be energized directly by the output from amplifier 62.

The photosensitive device 34 has been described as a photoconductive cell for the purposes of description. This device can be a photoemissive device, in which case a varying amount of current passes therethrough as a function of the intensity of light sensed thereby. When such a device is used, the associated electrical circuitry is arranged so that the variable current induced by the photoemissive device produces a variable voltage output for recording and control purposes. This device can also be one, such as a barrier-layer-type, which produces photovoltaic effect, i.e., the voltage produced by the device varies under the influence of light falling thereon. When a device of this latter type is used, the associated electrical circuitry is arranged so that the variable voltage induced by the photosensitive device produces a variable voltage output for recording and control purposes.

This invention can be used in conjunction with articles made from a variety of materials. The only essential limitation is that the material be capable of transmitting light.

As will be evident to those skilled in the art, various modifications and alterations can be made to this invention in view of the foregoing disclosure without departing from the scope and spirit thereof.

We claim:

1. An apparatus for cutting a tubular article made from a material capable of transmitting light and having neck-down portions comprising:
   (a) means for effecting movement of the tubular article along a predetermined path;
   (b) a cutter disposed transversely of the path of movement of the article;
   (c) a chamber disposed in the path of movement of said article upstream of said cutter relative to the path of movement of said article having inlet and outlet openings for passage of said article therethrough;
   (d) a light source positioned in said chamber and disposed adjacent the path of movement of said article for directing light onto the outer surface of said article and transmitting light through the walls of said article;
   (e) a detector means positioned in said chamber disposed adjacent the path of movement of said article and spaced from said light source so that said article passes therebetween, said detector means being characterized in that it is responsive to the light transmitted through the walls of said article and falling thereon of increasing and decreasing intensity.
   (f) an electrical circuit interconnected with detector means for producing a variable electrical output representative of the wall thickness of said article as said detector means responds to said light falling thereon; and
   (g) means for operating said cutter responsive to said electrical output when electrical output reaches a predetermined level.

2. The apparatus according to claim 1 wherein said detector means comprises a photoconductive cell.

3. The apparatus according to claim 1 further comprising a means connected between said electrical circuit and said cutter operating means for receiving a predetermined number of discrete electrical inputs at a predetermined level and then transmitting a single electrical output to operate said cutting operating means.

4. The apparatus according to claim 1 further comprising a means connected to said electrical circuit for indicating said variable electrical output.

5. The apparatus according to claim 2 wherein said means for operating said cutter operating means comprises an amplifier connected to said electrical circuit for receiving said electrical output therefrom; a control relay connected to said amplifier, said control relay being energized when the amplified electrical output reaches a predetermined level; and means for operating said cutter when said control relay is energized.

6. The apparatus according to claim 4 wherein said indicating means is a recorder.

7. In an apparatus for cutting a continuous tubular extrudate of polymeric material capable of transmitting light comprising an extrusion means for forming said tubular extrudate with internal neck-down sections, an extrudate cooling means, a means for cutting said extrudate into parison lengths, and means for moving said extrudate from said extrusion means through said parison cutting means, a control system comprising:
   (a) a chamber positioned in the path of movement of said extrudate upstream of said parison cutting means relative to the movement of said extrudate having inlet and outlet openings for passage of said extrudate therethrough;
   (b) a light source positioned in said chamber and disposed adjacent the path of said movement of said extrudate for directing light onto the outer surface of said extrudate;
   (c) a photoconductive cell positioned in said chamber disposed adjacent the path of movement of said extrudate and spaced from said light source so that said extrudate passes therebetween, the electrical resistance imposed by said cell decreasing and increasing as the intensity of light transmitted through the walls of said extrudate and falling thereon increases and decreases, respectively;
   (d) an electrical circuit including a DC voltage supply and a fixed resistor interconnected with said cell for producing a variable voltage output representative of the wall thickness of said extrudate as the electrical resistance of said cell changes responsive to the light falling thereon;
   (e) an amplifier connected to said electrical circuit to receive said voltage output;
   (f) a control relay connected to said amplifier to receive the amplified output which is energized when said amplified electrical output reaches a predetermined level; and
   (g) means for operating said parison cutter when said control relay is energized.

References Cited

UNITED STATES PATENTS

| 2,429,331 | 10/1947 | Sachtleben | 250—219 X |
| 2,517,330 | 8/1950 | Marenholtz | 356—161 |
| 3,307,446 | 3/1967 | Rottmann | 250—219 X |

WALTER STOLWEIN, Primary Examiner

U.S. Cl. X.R.

83—365; 250—219; 356—161